US008231451B2

(12) United States Patent
Englman et al.

(10) Patent No.: US 8,231,451 B2
(45) Date of Patent: Jul. 31, 2012

(54) WAGERING GAME WITH PLAYER PRE-SELECTING BONUS FEATURE

(75) Inventors: Allon G. Englman, Chicago, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 941 days.

(21) Appl. No.: 12/295,370

(22) PCT Filed: Mar. 30, 2007

(86) PCT No.: PCT/US2007/007949
§ 371 (c)(1),
(2), (4) Date: Sep. 30, 2008

(87) PCT Pub. No.: WO2007/123710
PCT Pub. Date: Nov. 1, 2007

(65) Prior Publication Data

US 2009/0176552 A1 Jul. 9, 2009

Related U.S. Application Data

(60) Provisional application No. 60/788,535, filed on Mar. 31, 2006.

(51) Int. Cl.
*A63F 13/00* (2006.01)

(52) U.S. Cl. ........................................ 463/20

(58) Field of Classification Search .................... 463/20, 463/9, 16, 18, 25–26
See application file for complete search history.

(56) References Cited

U.S. PATENT DOCUMENTS

| | | | | |
|---|---|---|---|---|
| 6,309,300 | B1 * | 10/2001 | Glavich | 463/26 |
| 6,328,649 | B1 * | 12/2001 | Randall et al. | 463/20 |
| 6,645,073 | B2 | 11/2003 | Lemay et al. | |
| 7,354,342 | B2 * | 4/2008 | Paulsen et al. | 463/16 |
| 7,354,344 | B2 * | 4/2008 | Paulsen et al. | 463/20 |
| 7,390,260 | B2 | 6/2008 | Englman | 463/20 |
| 7,559,840 | B1 | 7/2009 | D'Avanzo | 463/30 |
| 7,566,271 | B2 * | 7/2009 | Hostetler et al. | 463/25 |
| 7,625,282 | B2 | 12/2009 | Baerlocher et al. | 463/25 |
| 7,651,392 | B2 * | 1/2010 | Pennington et al. | 463/16 |
| 7,713,123 | B2 | 5/2010 | Gerson et al. | 463/25 |
| 7,785,195 | B2 | 8/2010 | Palmer et al. | 463/25 |
| 7,905,772 | B2 | 3/2011 | Baerlocher et al. | 463/20 |
| 7,959,508 | B2 | 6/2011 | Gauselmann | 463/25 |
| 8,033,910 | B2 | 10/2011 | Davis | 463/25 |
| 8,087,991 | B2 | 1/2012 | D'Avanzo | 463/20 |
| 2002/0025846 | A1 * | 2/2002 | Bennett et al. | 463/20 |
| 2003/0054875 | A1 * | 3/2003 | Marks et al. | 463/20 |
| 2003/0162583 | A1 * | 8/2003 | Baerlocher et al. | 463/20 |
| 2004/0053665 | A1 * | 3/2004 | Baerlocher | 463/16 |

(Continued)

OTHER PUBLICATIONS

PCT International Search Report for International Application No. PCT/US2007/07949 dated Jun. 11, 2008 (2 pages).

(Continued)

*Primary Examiner* — Dmitry Suhol
*Assistant Examiner* — Jason Yen
(74) *Attorney, Agent, or Firm* — Nixon Peabody LLP

(57) ABSTRACT

A gaming machine for conducting a wagering game includes a display for displaying a plurality of symbols indicating a randomly selected outcome and a selection-input device for selecting at least one bonus item from a plurality of bonus items. Each time a winning outcome is achieved, the selected bonus item reveals at least one of a plurality of bonus awards.

19 Claims, 10 Drawing Sheets

U.S. PATENT DOCUMENTS

| | | | | |
|---|---|---|---|---|
| 2004/0053678 | A1 | 3/2004 | Savio et al. | |
| 2004/0053679 | A1 | 3/2004 | Getz et al. | |
| 2004/0121838 | A1* | 6/2004 | Hughs-Baird et al. | 463/25 |
| 2004/0219962 | A1* | 11/2004 | Vancura | 463/9 |
| 2005/0101368 | A1* | 5/2005 | Thomas | 463/16 |
| 2005/0130731 | A1* | 6/2005 | Englman et al. | 463/20 |
| 2005/0245309 | A1* | 11/2005 | Englman | 463/20 |
| 2006/0025201 | A1* | 2/2006 | Van Asdale | 463/20 |
| 2006/0121978 | A1* | 6/2006 | Hornik et al. | 463/20 |

OTHER PUBLICATIONS

PCT Written Opinion for International Application No. PCT/US2007/07949 dated Jun. 11, 2008 (2 pages).

* cited by examiner

WAGERING GAME WITH PLAYER PRE-SELECTING BONUS FEATURE

CROSS REFERENCE TO RELATED APPLICATIONS

This application is a U.S. national stage of International Application No. PCT/US2007/07949, filed Mar. 30, 2007, which is related to and claims priority to U.S. Provisional Application No. 60/788,535, filed Mar. 31, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having a feature for awarding a selected bonus item with each winning outcome of the wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

SUMMARY OF THE INVENTION

According to one aspect of the present invention, a gaming machine includes a display for displaying a wagering game having a plurality of symbols that indicate a randomly selected outcome selected from a plurality of outcomes in response to receiving a wager input from a player. The wagering game includes a plurality of bonus items. The plurality of outcomes includes at least one winning outcome. The gaming machine also includes a selection-input device for selecting at least one bonus item from the plurality of bonus items. Each time at least one winning outcome is displayed, the selected bonus item reveals at least one of a plurality of bonus awards.

According to another aspect of the invention, a method of conducting a wagering game on a gaming machine comprises receiving a wager input from a player for playing the wagering game. The wagering game includes a plurality of symbols that indicates a randomly selected outcome selected from a plurality of outcomes. The plurality of outcomes includes at least one winning outcome. The method also comprises the acts of receiving a player selection of a bonus item from a plurality of bonus items, wherein the bonus item is associated with at least one of a plurality of bonus awards, and, after receiving the player selection of the bonus item, displaying at least one winning outcome from the plurality of outcomes. The method further comprises the acts of revealing at least one bonus award associated with the selected bonus item after displaying at least one winning outcome and awarding at least one bonus award to the player.

According to yet another aspect of the invention, a computer readable storage medium is encoded with instructions for directing a gaming device to perform the above method.

According to another aspect of the invention, a method of conducting a wagering game comprises the acts of providing a wager input, selecting a first bonus item from a plurality of bonus items, achieving a winning outcome in the wagering game and awarding a credit award associated with the winning outcome. The method further comprises the acts of revealing a bonus award associated with the selected first bonus item, wherein the bonus award is a modifier of the winning outcome.

According to a further aspect of the invention, a gaming system for playing a wagering game comprises a plurality of linked gaming machines being operable to receive wagers from players. The plurality of linked gaming machines have different themes. Each of the plurality of linked gaming machines includes a plurality of bonus items located on at least one display for displaying the basic wagering game associated with each linked gaming machine. The plurality of bonus items are selectable by a player prior to play of the basic wagering game. The selected bonus items are revealed after each winning outcome of the basic wagering game is achieved.

Additional aspects of the invention will be apparent to those of ordinary skill in the art in view of the detailed description of various embodiments, which is made with reference to the drawings, a brief description of which is provided below.

DETAILED DESCRIPTION

Figure 1:
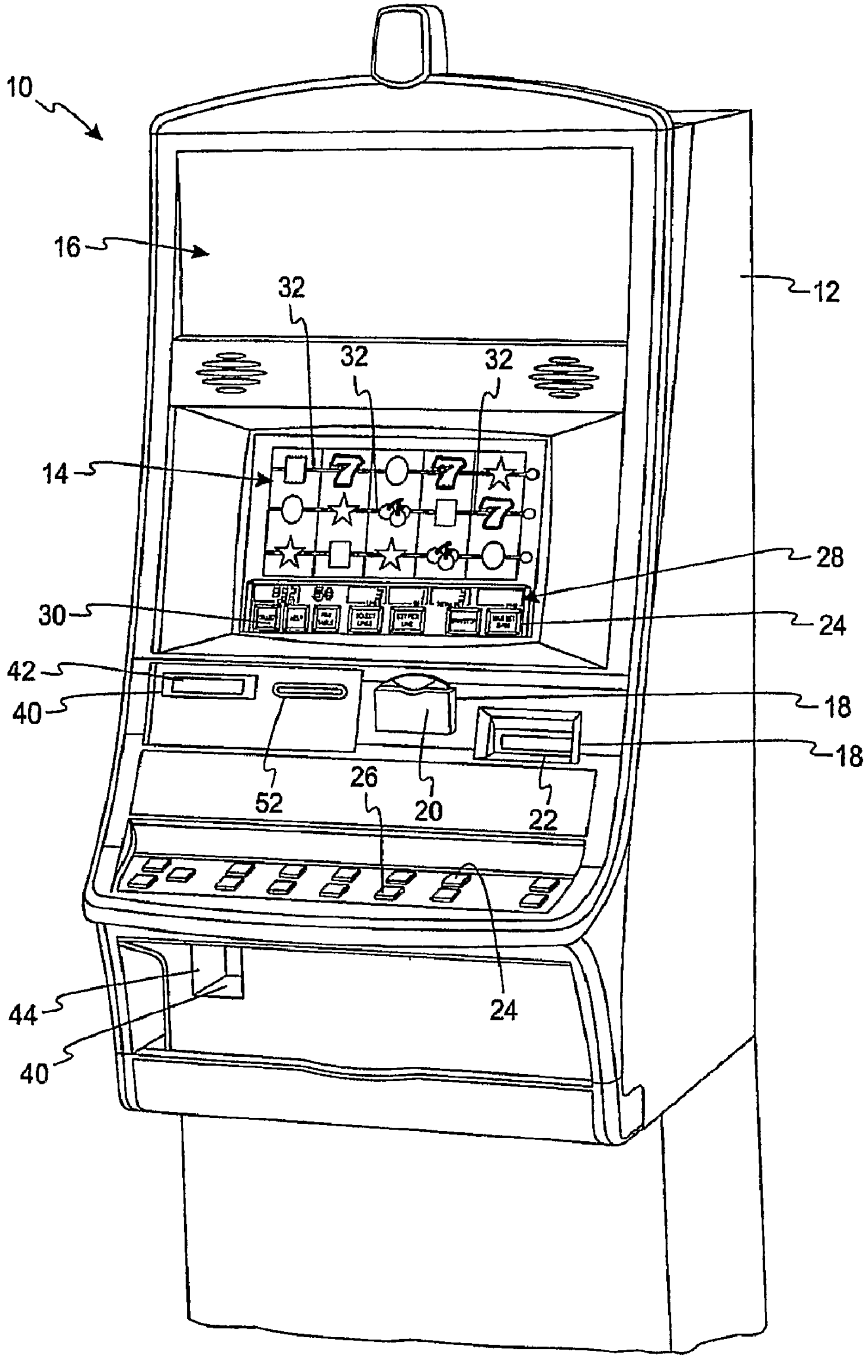
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an “upright” version in which the primary display 14 is oriented vertically relative to the player. Alternatively, the gaming machine may be a “slant-top” version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
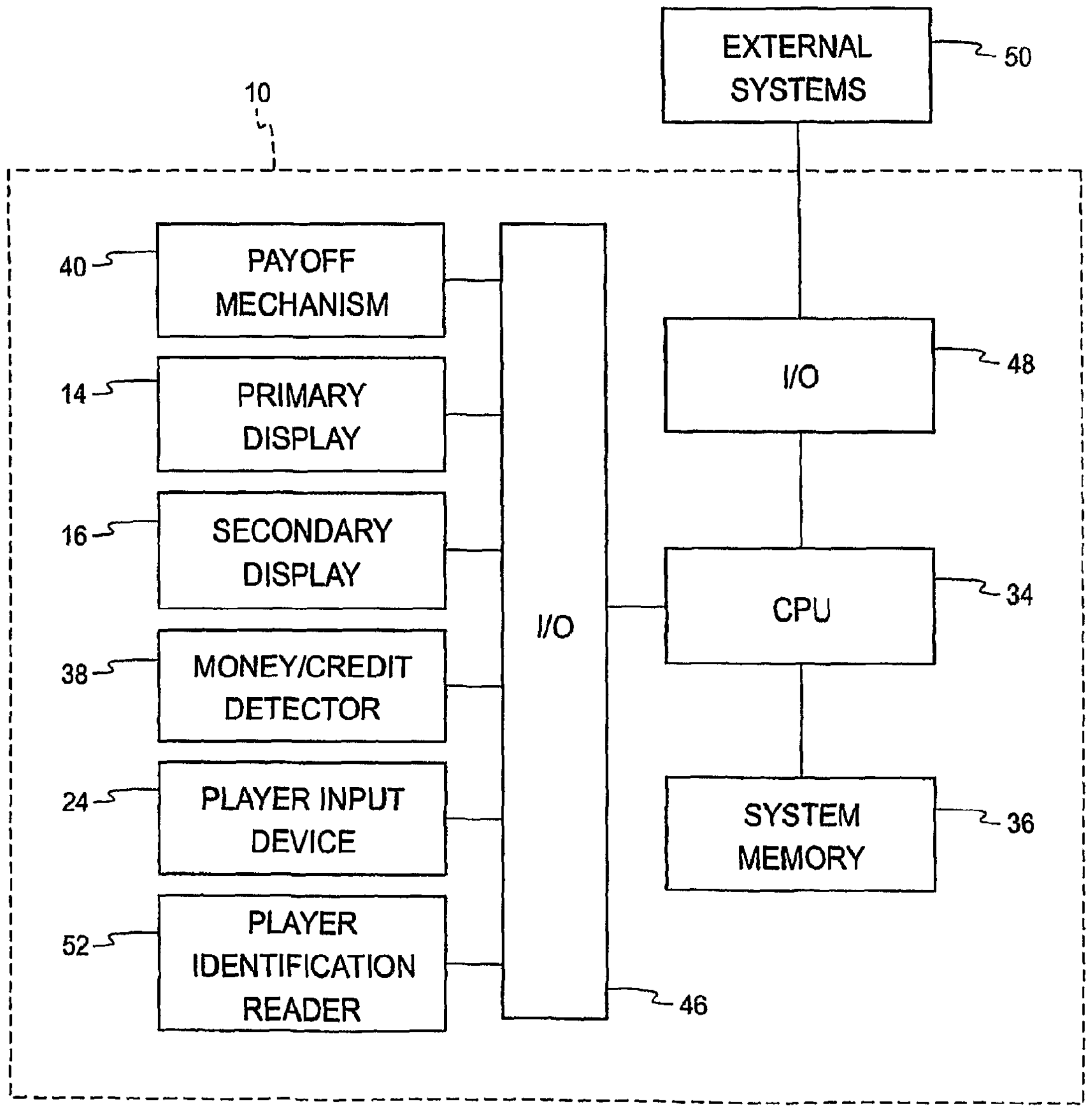
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g. a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
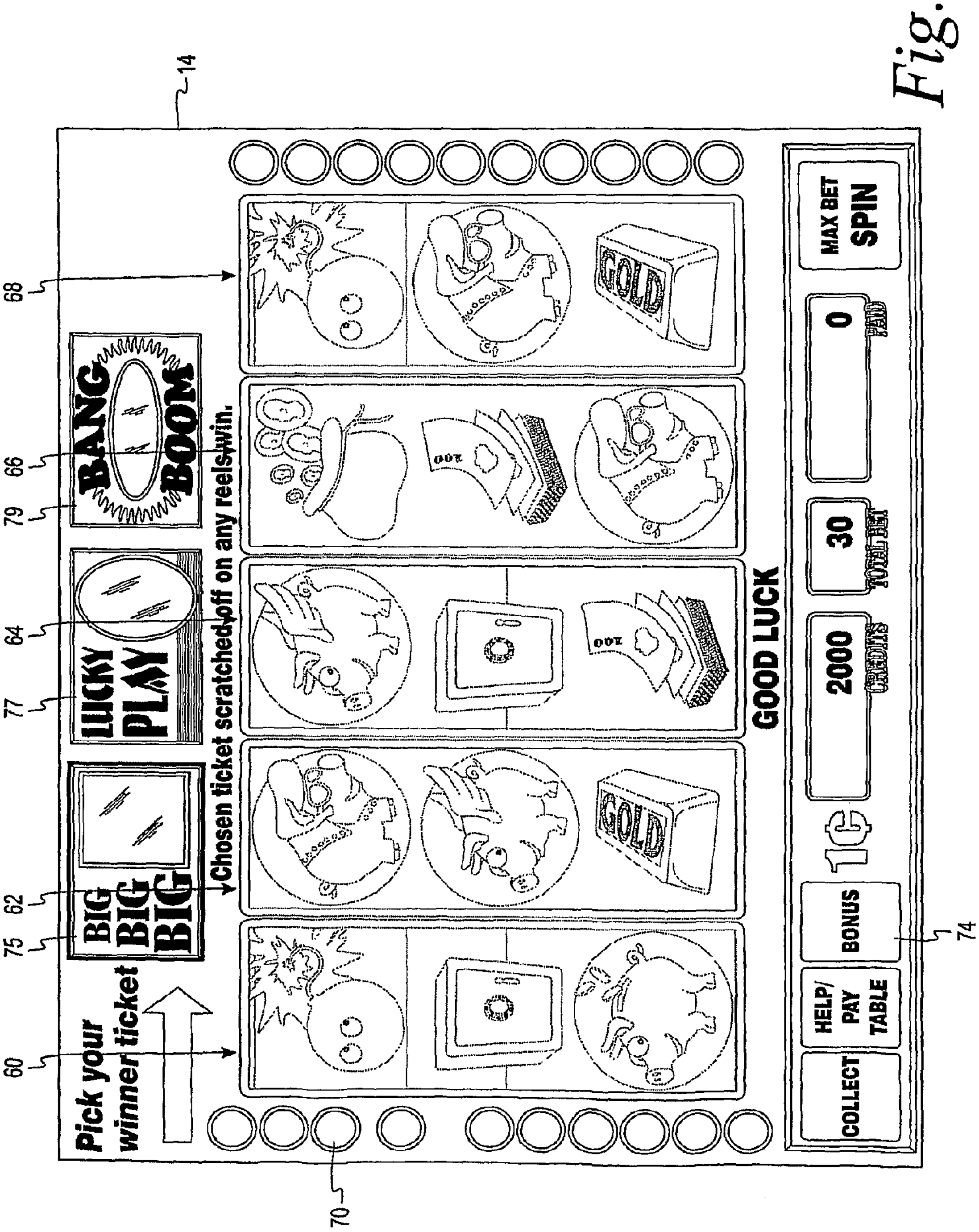
FIG. 3 is a primary display of the gaming machine of FIG. 1 displaying a plurality of bonus items according to one embodiment of the present invention.

The primary display 14 of one embodiment of the present invention is shown in more detail in FIG. 3. In this embodiment, the basic wagering game is a slot machine game, with symbols on the five reels 60, 62, 64, 66, 68. The reels 60, 62, 64, 66, 68 may be either traditional mechanical reels or they may be computer-generated images of reels, with each reel including a plurality of symbols. Upon receiving a wager input, the payline indicator(s) 70 indicates which paylines have been selected (i.e., activated) by the player. A randomly selected outcome from a plurality of outcomes is then indicated along the payline(s) in the form of a combination of symbols on the reels 60, 62, 64, 66, 68. An outcome indicator (shown in the "PAID" window in FIG. 3) may indicate whether the outcome has resulted in a winning outcome or a non-winning outcome. While the embodiment shown in FIG. 3 includes five reels, gaming machines having more or less than five reels are also contemplated by the present invention. It is also contemplated that the present invention could be used with gaming machines having other wagering games such as blackjack, slots, keno, poker, blackjack, roulette, or other video casino games.

Once a player places a wager, the randomly selected outcome is displayed via the primary display 14 on the reels 60, 62, 64, 66, 68. The symbols displayed on the reels 60, 62, 64, 66, 68 indicate the randomly selected outcome to the player. If a player achieves a winning outcome, the player may be awarded a monetary award, such as a credit award, or a non-monetary award, such as a number of free spins or the opportunity to participate in a bonus game.

According to one embodiment of the present invention, the wagering game includes a plurality of bonus items. The player is given the opportunity to select at least one bonus item before every outcome of the basic game, i.e., before spinning the reels 60-68. In the particular embodiment shown in FIG. 3, the wagering game includes a plurality of bonus items 75, 77, 79, i.e., three "winner tickets," displayed at the top of the primary display 14. Each of the bonus items 75, 77, 79 is associated with a bonus award (not shown in FIG. 3) from a plurality of bonus awards. Prior to having started play of the basic game; the player is allowed to select at least one of the bonus items 75, 77, 79. The bonus awards associated with the bonus items 75, 77, 79 are not revealed at the time of selection of the bonus item. In the event of a winning outcome in the basic game, the selected bonus item (shown as highlighted bonus item 75) reveals a bonus award as described below. In some embodiments, it is also contemplated that the player may be allowed to select a bonus item 75, 77, 79 after the reels 60-68 are spun and a winning outcome is displayed.

In the embodiment shown in FIG. 3, the bonus items 75, 77, 79 appear as "winner tickets" that are "scratched off" if a winning outcome occurs in the basic game. The bonus items 75, 77, 79 may show different types of "winner tickets," such as "BIG BIG BIG," "LUCKY PLAY" or "BANG BOOM." As described above, the player selects one of the bonus items 75, 77, 79 prior to initiation of the basic game or at least prior to the display of the outcome of the basic game. In other embodiments, the selection of a bonus item may occur after a winning outcome is displayed. While the particular embodiment in FIG. 3 displays three bonus items 75, 77, 79 for player selection, it is also contemplated that more or less than three bonus items may be displayed for selection of at least one of the bonus items.

In some embodiments, as mentioned above, the player selects a bonus item from the displayed bonus items 75, 77, 79 prior to play of the basic game. Selection may occur via a selection input device using buttons 26 or touch screen keys 30. For example, one of the buttons 26 may include a bonus item selection button 74. Once selected, the selected bonus item may be kept as the selected bonus item until the player selects a different bonus item. For example, as shown in FIG. 3, the player has initially selected the bonus item 75. In some embodiments, in subsequent plays of the wagering game, the selection of bonus item 75 will occur automatically based on the player's prior selection of bonus item 75. This pre-selection of bonus item 75 is maintained until the player decides to select a different bonus item, such as bonus item 77 or bonus item 79.

Figure 4:
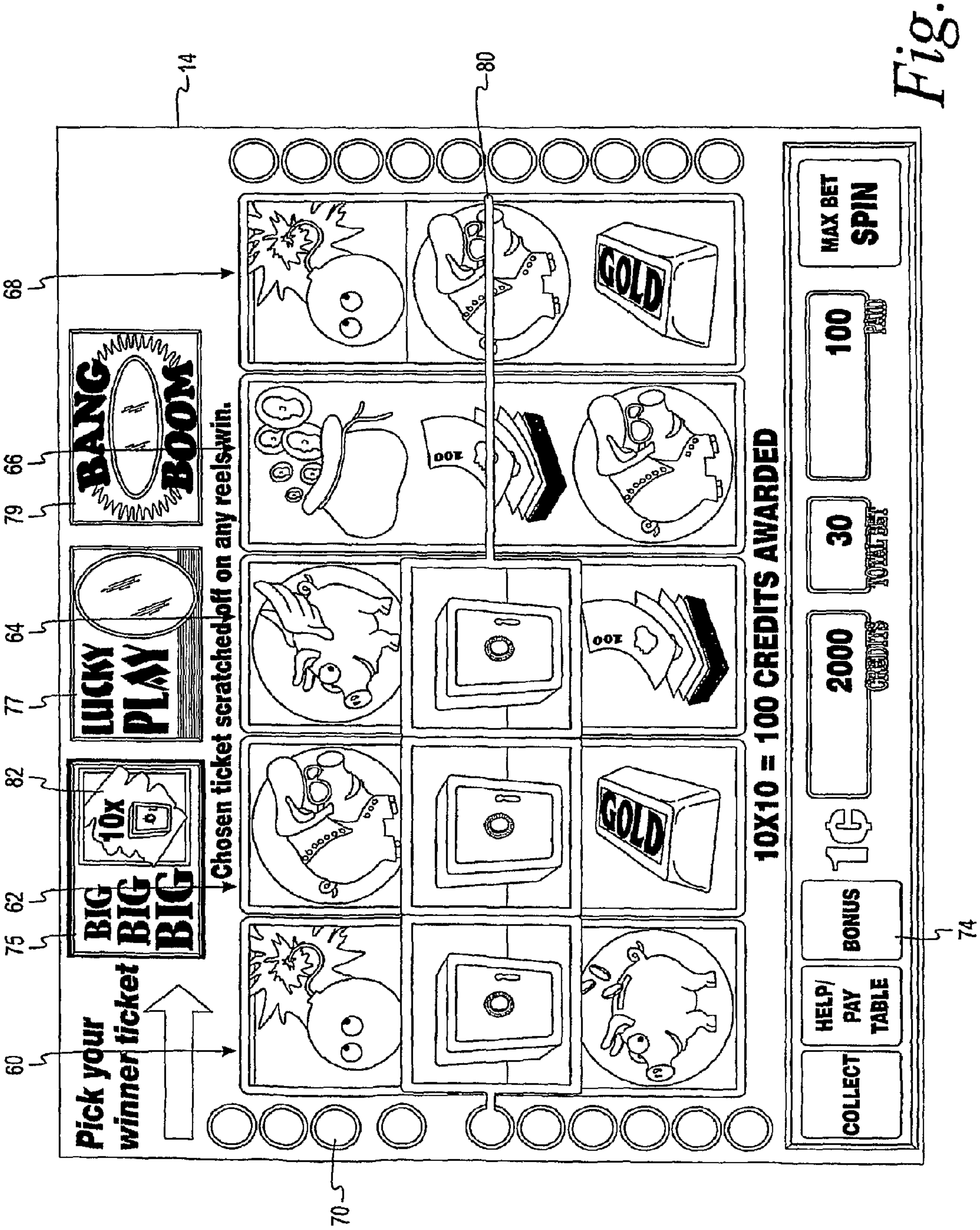
FIG. 4 is a primary display of the gaming machine of FIG. 1 displaying a bonus item that reveals a bonus award according to one embodiment of the present invention.

In some embodiments, a winning outcome may be indicated by a certain number of the same symbols along an active payline, a bonus symbol in combination with a certain number of same symbols, or other symbol combinations. In the particular embodiment shown in FIG. 4, the player achieves a winning outcome by achieving three VAULT symbols along active payline 80. The award credited for achieving three VAULT symbols is 10 credits. Upon achieving this winning outcome, the selected bonus item 75 is scratched off to reveal an associated bonus award 82. In the embodiment depicted in FIG. 4, the bonus award 82 revealed is a symbol multiplier award. This award is applicable to any winning outcome involving a specific symbol, in this case the VAULT symbol, as depicted in bonus award 82. The bonus award 82 multiplies any credit award earned in the basic game involving the VAULT symbol by 10. Thus, the 10 credits earned in the basic game for achieving the three VAULT symbols is multiplied by 10 to provide a final award of 100 credits.

Figure 5:
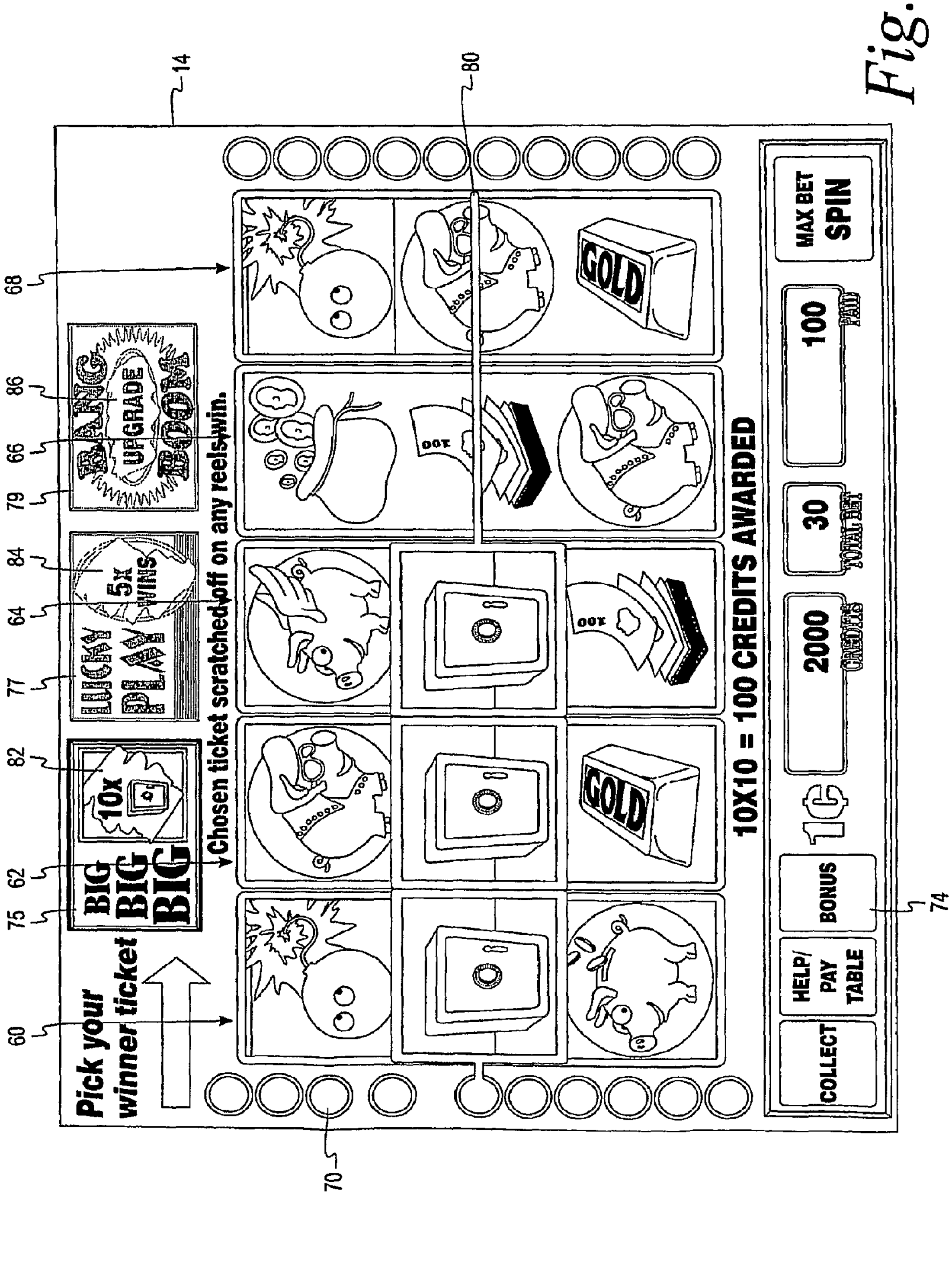
FIG. 5 is a primary display of the gaming machine of FIG. 1 displaying all bonus items revealing bonus awards according to one embodiment of the present invention.

In some embodiments, as shown in FIG. 5, after revealing the bonus award 82 associated with the selected bonus item 75, the unselected bonus items, i.e., bonus items 77 and 79, reveal their associated bonus awards, 84 and 86, respectively. The player can then see what he or she might have won had he or she chosen a different bonus item.

To be eligible to select at least one of the bonus items 75, 77, 79, a player may be required to wager an extra or additional wager. The additional wager may be made after the initial wager is input into the gaming machine 10 or anytime before the basic game is started. It is also contemplated that the additional wager may be made after a winning outcome is displayed. In other embodiments, in order to select one of the bonus items 75, 77, 79, the player must have input a maximum bet for at least one or a group of paylines, in addition to or in lieu of the extra or additional wager. Once the extra or additional wager is received by the gaming machine 10, the player makes a selection of at least one of the bonus items 75, 77, 79 using the selection-input device, i.e., the bonus item selection button 74. As mentioned above, the selection of at least one bonus item 75, 77, 79 may be maintained until the player decides to change his or her selected bonus item, also known as an "auto-pick" feature. Even if the pre-selection or "auto-pick" feature is in use, the player may still be required to input an extra or additional wager into the gaming machine 10 to activate the bonus selection feature.

It is contemplated that many different types of bonus awards may be associated with bonus items. One set of bonus awards may be modifiers that modify or alter a winning outcome. For example, in addition to the symbol multiplier shown as bonus award 82 in FIG. 5, the bonus awards may include an all-symbol multiplier which multiplies a credit award involving any symbol win in the basic game. Additionally, the bonus awards may include a wild symbol that turns all occurrences of a specific symbol in the basic game into a wild symbol, which can then increase the number of wins a player achieves based on the positions of the wild symbols on active-paylines. Other bonus awards may include a wild reel, which turns all symbols on a reel wild, a respin card that allows any reels with no winning symbols to spin again to attempt to obtain additional wins having a higher symbol pay, such as a 4- or 5-reel pay, and a free-spin bonus that awards a free spin of the basic game. With the free-spin bonus award, the player may again select a bonus item to be awarded in the event another winning outcome is achieved in the free spin of the basic game. While these are some examples of modifiers that may alter the winning outcome, it is contemplated that many other modifiers can be used with the present invention.

Figure 6:
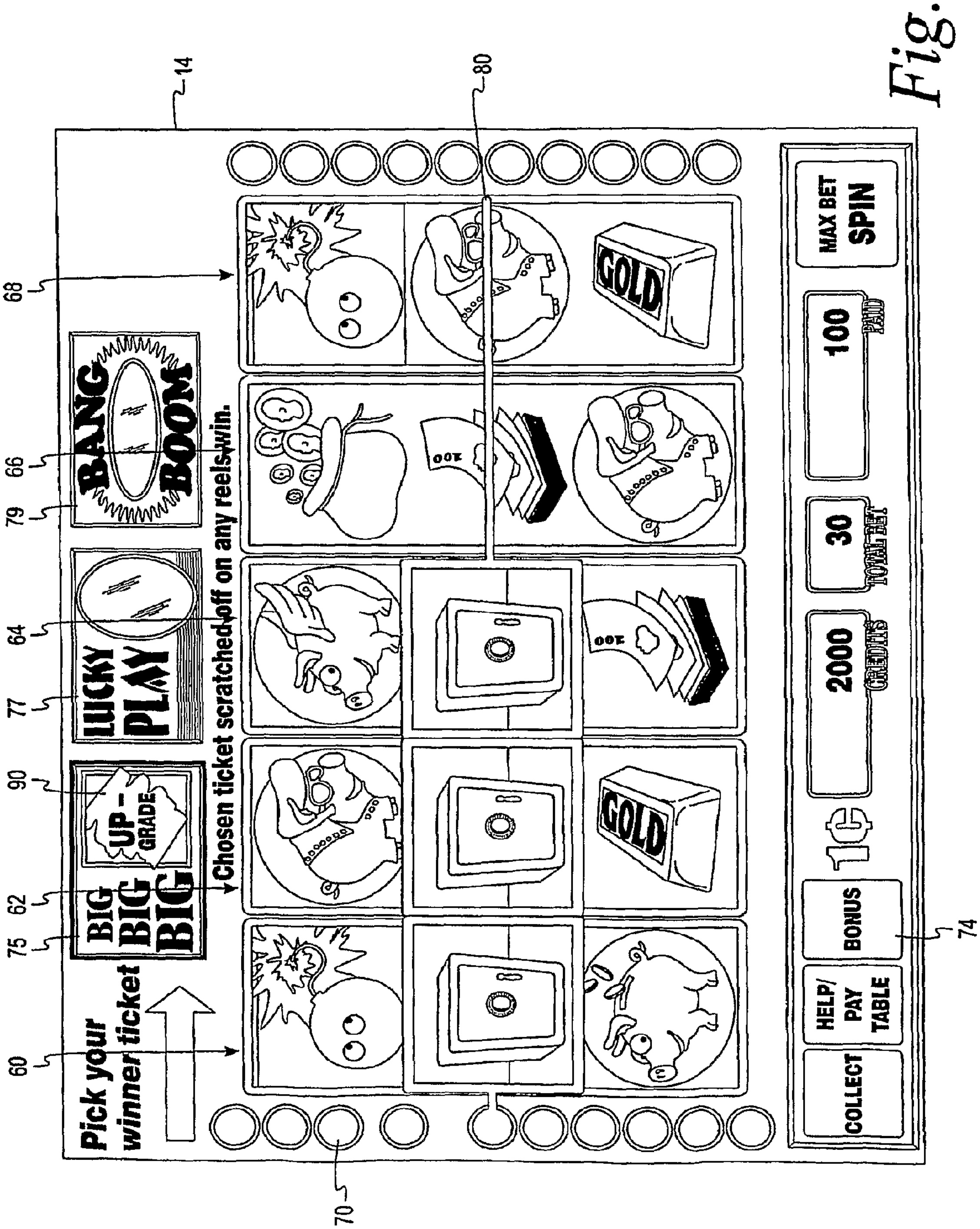
FIG. 6 is a primary display of the gaming machine of FIG. 1 displaying a bonus award having an upgrade feature according to one embodiment of the present invention.
Figure 7:
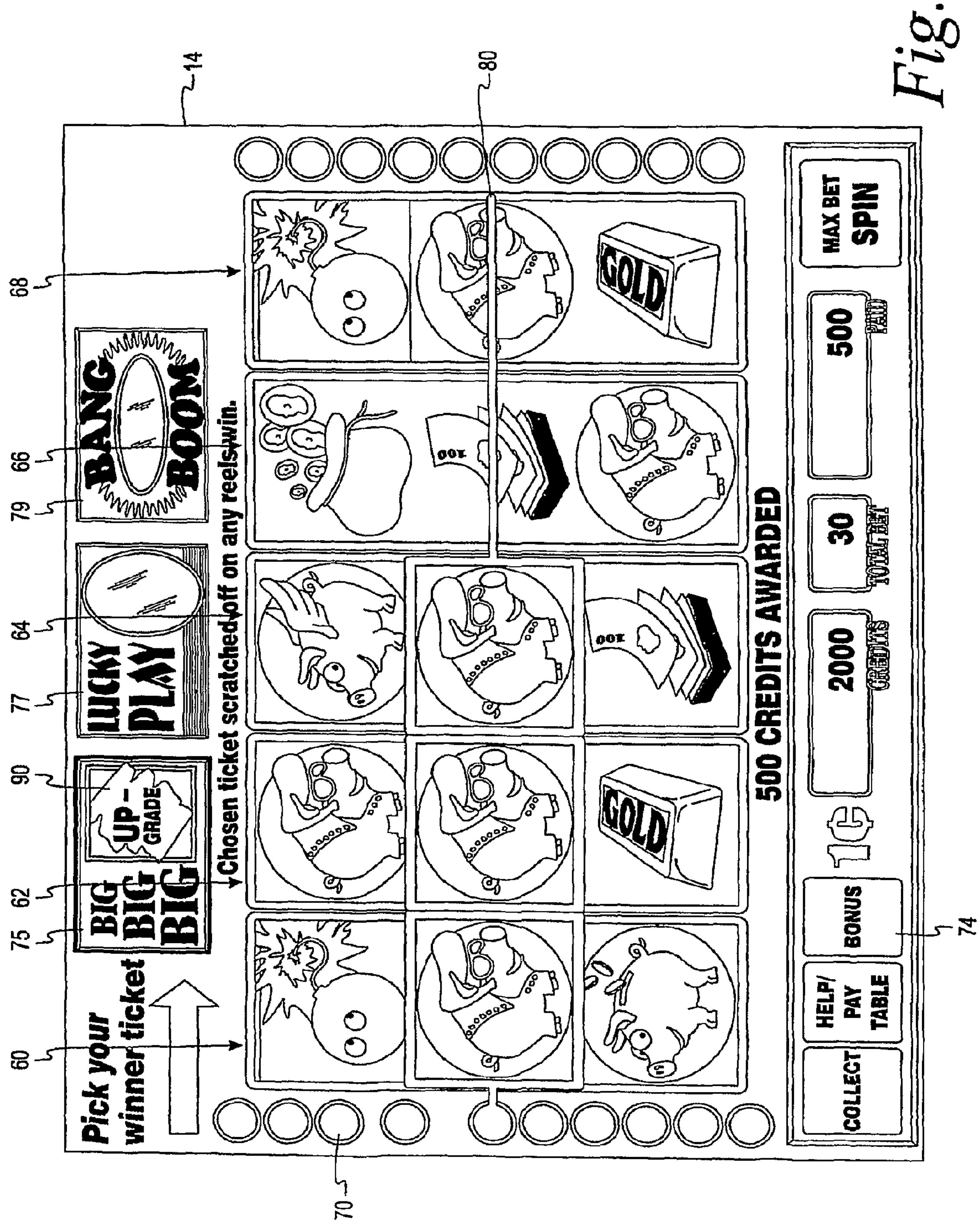
FIG. 7 is a primary display of the gaming machine of FIG. 1 displaying transformed symbols resulting from the upgrade feature of FIG. 6 according to one embodiment of the present invention.

Other bonus awards contemplated by the present invention include an upgrade bonus award 90. The upgrade bonus award 90, as depicted in FIG. 6, can be applied to any winning outcome to enhance the associated credit award. For example, the winning outcome depicted in FIG. 6 consisting of three VAULT symbols along payline 80 can be enhanced or upgraded to a different set of symbols associated with a higher credit award. FIG. 7 depicts the display 14 wherein the payline 80 that was formerly associated with three VAULT symbols is now associated with 3 ROCKER PIG symbols. The VAULT symbols have been transformed into ROCKER PIG symbols that are associated with a larger payout. For example, the payout for the three VAULT symbols, i.e., 10 credits, has been increased to the payout for the three ROCKER PIG symbols, i.e., 100 credits. In the embodiment depicted in FIG. 7, the transformation of the VAULT symbols into the ROCKER PIG symbols also changes a 3-symbol pay into a 5-symbol pay along another active bonus line, which may also increase the credit award accordingly. For example, a 5-symbol pay in FIG. 7 includes the five ROCKER PIG symbols located on the following reels: reel 60, row 2; reel 62, row 1; reel 64, row 2; reel 66, row 3; and reel 68, row 2.

Figure 8:
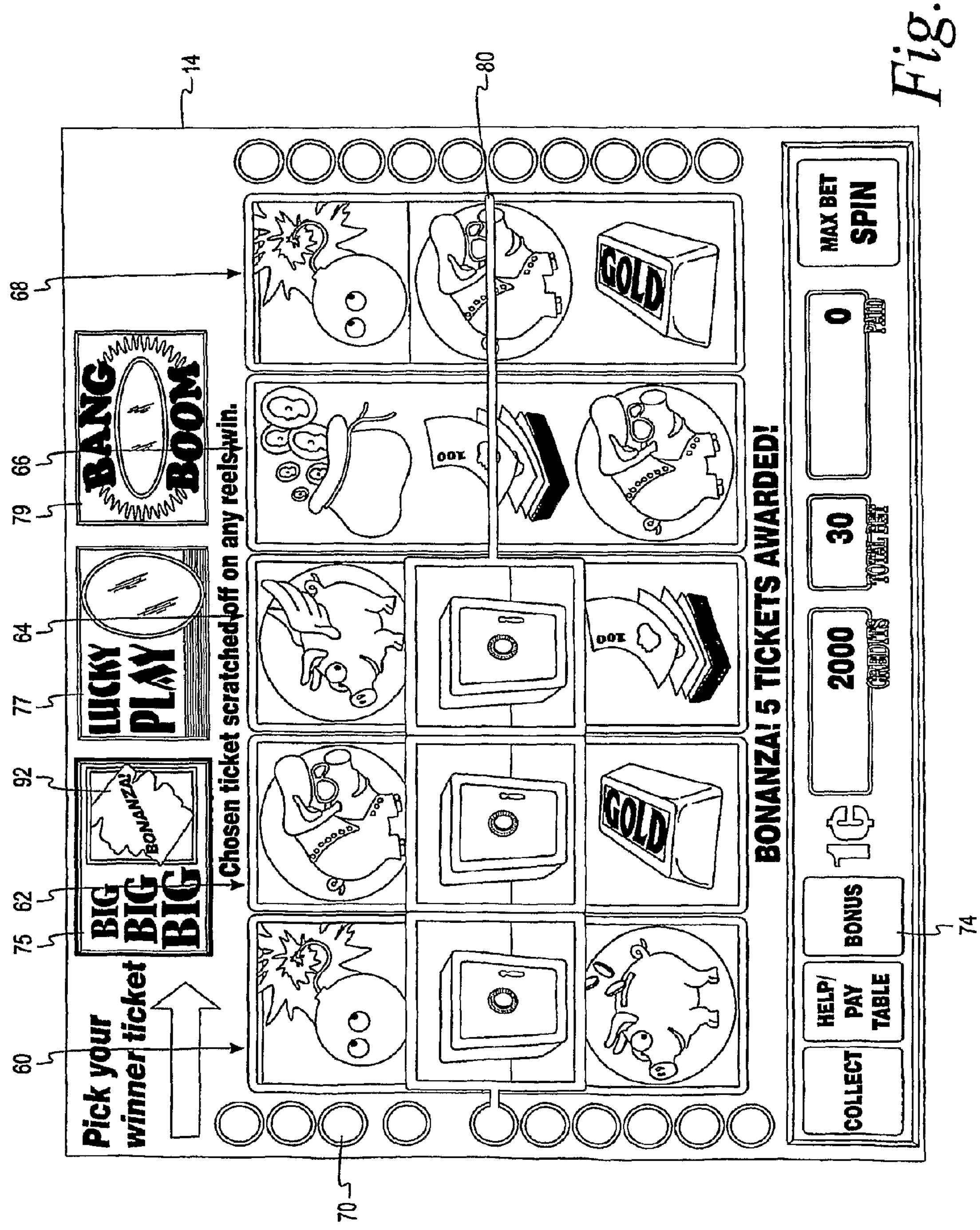
FIG. 8 is a primary display of the gaming machine of FIG. 1 displaying a bonus award having a bonanza feature according to one embodiment of the present invention.
Figure 9:
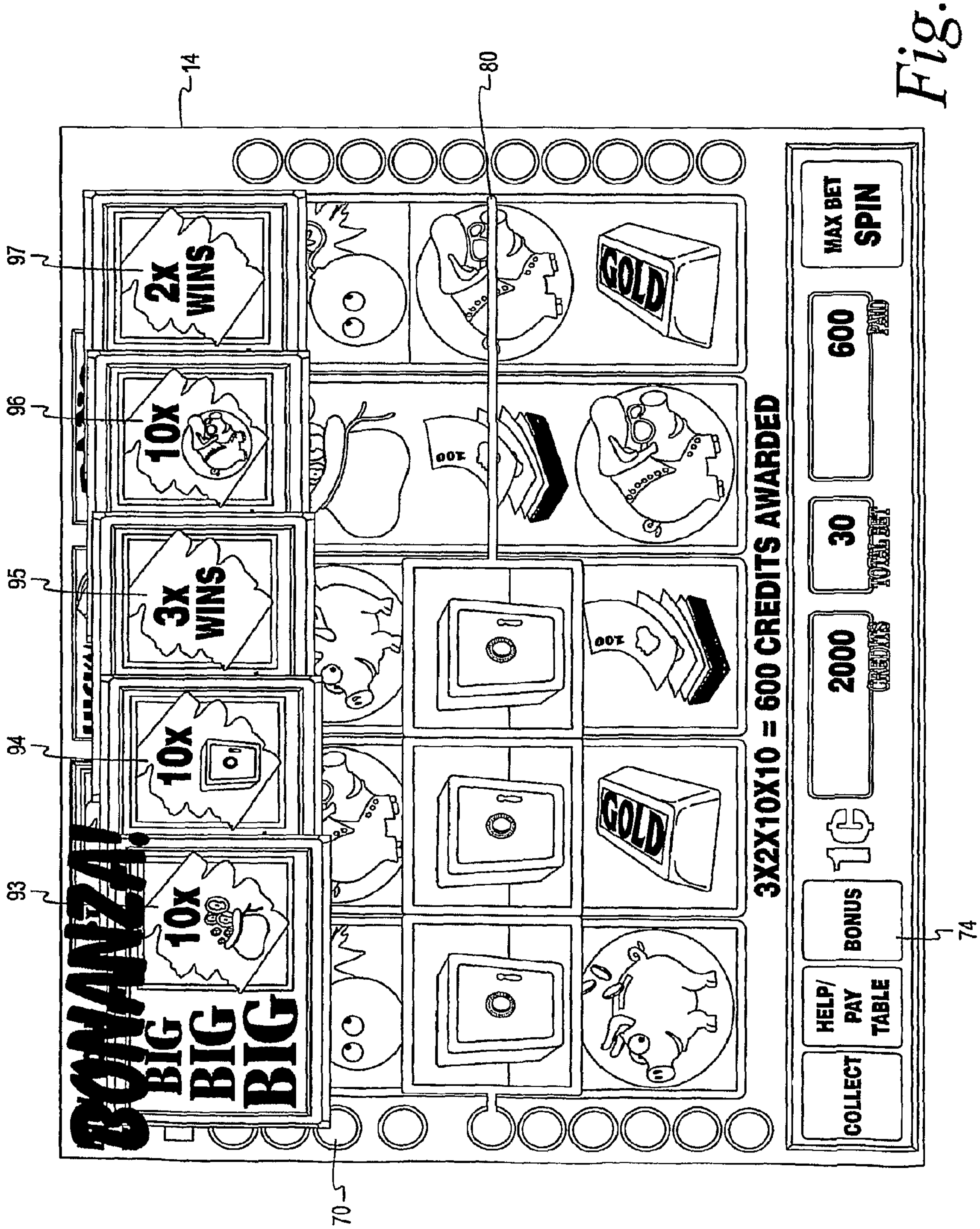
FIG. 9 is a primary display of the gaming machine of FIG. 1 displaying a new set of bonus items resulting from the bonanza feature of FIG. 8 that reveal additional bonus awards according to one embodiment of the present invention.

Another bonus award contemplated by the present invention includes a bonanza bonus award 92, as depicted in FIG. 8. The bonanza bonus award 92 rewards the player with additional bonus items 93, 94, 95, 96, 97, as shown in FIG. 9. The additional bonus items 93-97 have associated bonus awards which are all revealed and awarded to the player. In the example of FIG. 9, the bonus items 93, 94, 96 have revealed symbol multipliers for multiplying awards involving specific symbols, such as COINS symbols, VAULT symbols and ROCKER PIG symbols, respectively. Each of these symbol multipliers multiplies any credit award that involves any of these symbols. For the example in FIG. 9, as the VAULT symbol is the only symbol involved, in the winning outcome associated with payline 80, then the corresponding credit award is multiplied by 10.

Bonus items 95 and 97 reveal an all-symbol multiplier bonus award that multiplies a wining outcome involving any symbols displayed in the basic game. For example, a 3-times multiplier is associated with bonus item 95 and a 2-times multiplier is associated with bonus item 97. Thus, the total credit award taking into account the symbol multiplier and the all-symbol multipliers, is equal to the original credit award (i.e., 10) multiplied by 10×2×3, or 60-times the original credit award, i.e., 600 credits. Any other winning outcome that includes ROCKER PIG symbols or COINS symbols would also multiply a win at 60-times the original credit award.

Figure 10:
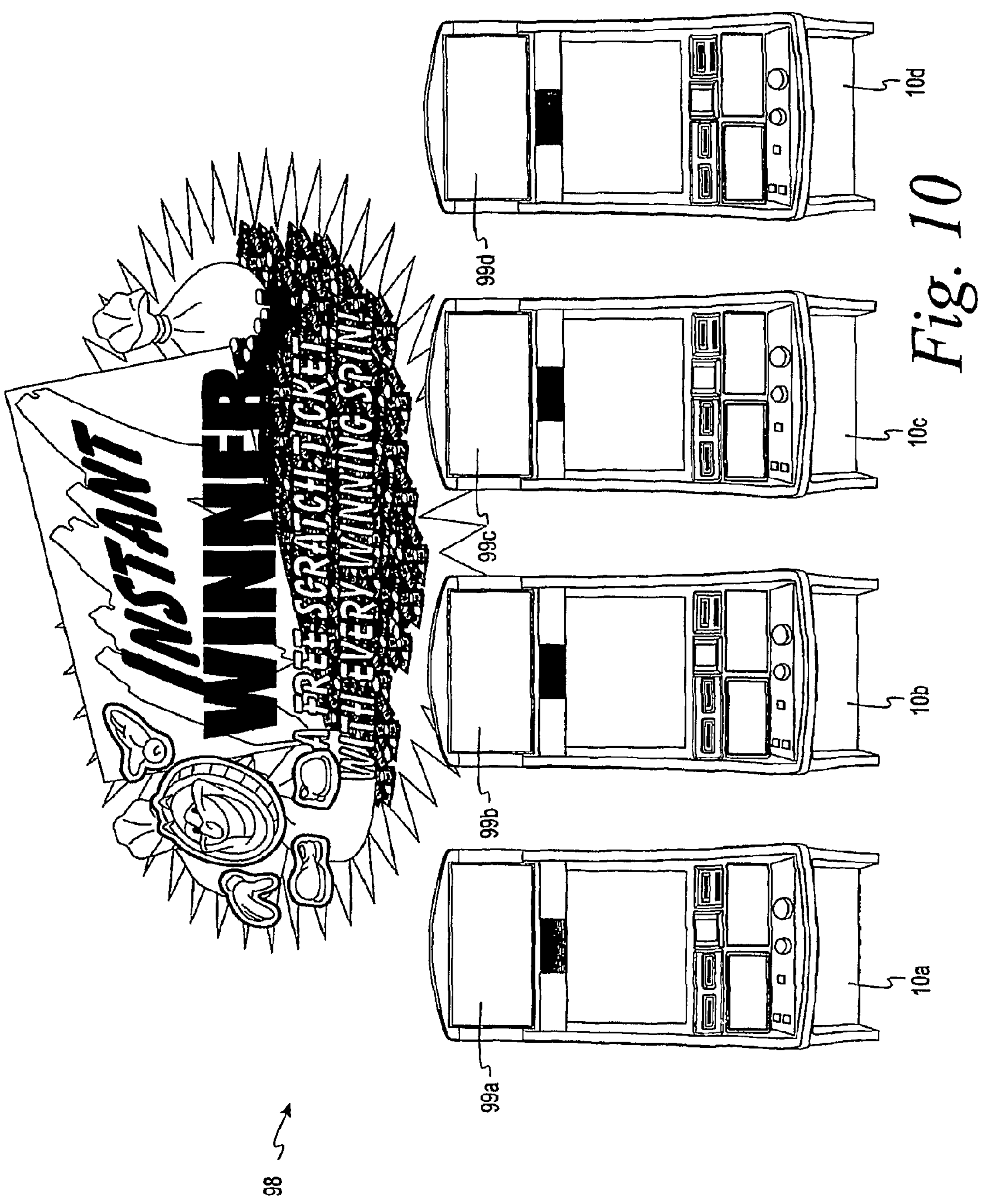
FIG. 10 is a group of gaming machines of FIG. 1 having a bonus-selection feature according to one embodiment of the present invention.

In addition to having a single gaming machine 10 that includes bonus items that are selectable by a player and that are awarded after every winning outcome of a basic game, it is contemplated that a bank of gaming machines 98 may include such a bonus-selection feature. As shown in FIG. 10, the bank 98 may be made up of a plurality of gaming machines 10*a*, 10*b*, 10*c*, 10*d*. Alternatively, the bank 98 may have more or less than four gaming machines 10. Each of the gaming machines 10 may be directed to a different theme. However, each of the gaming machines 10 includes a plurality of bonus items located on a display 99*a*, 99*b*, 99*c*, 99*d*. The bonus items may be located at the top of the primary display 14, as shown in FIGS. 3-9, or on a secondary display 16. As described herein, the plurality of bonus items are selectable by a player and are revealed after each winning outcome is achieved at the gaming machine 10*a*, 10*b*, 10*c*, 10*d*.

Each of these embodiments and obvious variations thereof is contemplated as falling within the spirit and scope of the claimed invention, which is set forth in the following claims.

What is claimed is:

1. A gaming system for conducting a wagering game having a plurality of player-selectable bonus items, the gaming system comprising:

at least one input device;

one or more display devices for displaying symbols that indicate a randomly selected outcome selected from a plurality of outcomes, the plurality of outcomes including at least one winning outcome;

one or more processors; and at least one memory device storing instructions that, when executed by the one or more processors, cause the gaming system to receive a wager from a player to initiate the wagering game;

receive a selection from the player of at least one bonus item from the plurality of bonus items, the at least one bonus item associated with at least one of a plurality of bonus awards, the plurality of bonus awards including a bonanza award;

after receiving the selection, display the at least one winning outcome of the plurality of outcomes;

after displaying the at least one winning outcome, reveal the at least one bonus award associated with the selected bonus item; and in response to the at least one bonus award being the bonanza award, (i) award the player the bonanza award including a plurality of additional bonus items, (ii) reveal at least one additional award associated with each of the plurality of additional bonus items, and (iii) award the player the at least one additional award associated with each of the plurality of additional bonus items, wherein at least one of the additional bonus items is not directly selected by the player.

2. The gaming system of claim 1, wherein the plurality of bonus awards further includes a symbol multiplier, an all-symbol multiplier, a wild symbol, a wild reel, a respin, and a free spin bonus.

3. The gaming system of claim 1, wherein one of the plurality of bonus awards is an upgrade award replacing at least one of the plurality of symbols with a symbol associated with a higher payout.

4. The gaming system of claim 1, wherein the at least one selected bonus item is retained automatically for subsequent plays of the wagering game until the player selects a different bonus item.

5. The gaming system of claim 1, wherein the at least one selected bonus item is revealed due to at least one winning outcome displayed in a free-spin bonus.

6. The gaming system of claim 1, wherein the at least one bonus item selected from the plurality of bonus items is selectable only in response to an additional wager input.

7. A method of conducting a wagering game on a gaming machine, the wagering game including a plurality of symbols that indicate a randomly selected outcome selected from a plurality of outcomes, the plurality of outcomes including at least one winning outcome, the method comprising:

receiving, via at least one input device, a wager from a player to initiate the wagering game;

receiving, via the at least one input device, a selection from the player of a bonus item from a plurality of bonus items, the bonus item associated with at least one of a plurality of bonus awards, the plurality of bonus awards including a bonanza award;

after receiving the player selection of the bonus item, displaying, via one or more display devices, the at least one winning outcome from the plurality of outcomes;

after displaying the at least one winning outcome, revealing the at least one bonus award associated with the selected bonus item; and in response to the at least one bonus award being the bonanza award, awarding the player, via one or more processors, the bonanza award including a plurality of additional bonus items, and revealing and awarding to the player, via the one or more processors, an additional award associated with each of the additional bonus items of the plurality of additional bonus items, wherein at least one of the additional bonus items is not directly selected by the player.

8. The method of claim 7, further comprising receiving an additional wager associated with the act of receiving a player selection of a bonus item.

9. The method of claim 7, wherein the plurality of bonus awards further includes a symbol multiplier, an all-symbol multiplier, a wild symbol, a wild reel, a respin, a free spin bonus and a symbol upgrade.

10. The method of claim 7, wherein the selected bonus item is retained automatically for subsequent plays of the wagering game until the player selects a different bonus item.

11. The method of claim 7, wherein the selected bonus item changes upon selection of a new bonus item by the player.

12. The method of claim 7, further comprising revealing the at least one bonus award associated with at least one unselected bonus item.

13. The method of claim 7, wherein if the at least one bonus award includes a free spin bonus award, the method further comprising receiving a second player selection of another bonus item, displaying another winning outcome achieved from the free spin bonus award and revealing the bonus award associated with the another bonus item.

14. A method of conducting a wagering game, the method comprising:

receiving, via at least one input device, a wager from a player to initiate the wagering game;

receiving, via the at least one input device, a selection from the player of a first bonus item from a plurality of bonus items;

randomly selecting, via one or more processors, a winning outcome in the wagering game, the winning outcome being selected from a plurality of possible outcomes;

displaying, via one or more display devices, the winning outcome after receiving the selection of the first bonus item;

awarding a credit award associated with the winning outcome;

revealing a bonus award associated with the selected first bonus item, the bonus award comprising a winning outcome modifier and a bonanza award;

applying, via the one or more processors, the winning outcome modifier to the winning outcome; and in response to the bonus award being the bonanza award, awarding the player the bonanza award via the one or more processors, and revealing and awarding to the player, via the one or more processors, an additional bonus award associated with each of a plurality of second bonus items, wherein at least one of the plurality of second bonus items is not selected by the player.

15. The method of claim 14, further comprising applying the winning outcome modifier to the credit award.

16. The method of claim 15, wherein the winning outcome modifier includes a symbol that matches a set of symbols associated with the winning outcome.

17. The method of claim 15, wherein the winning outcome modifier multiplies the credit award.

18. A computer-readable, non-transitory medium including executable instructions that, when executed by a gaming system, cause the gaming system to perform a method comprising:

receiving, via at least one input device, a wager from a player to initiate a wagering game including a plurality of outcomes, at least one outcome of the plurality of outcomes being a winning outcome;

receiving, via the at least one input device, a selection from the player of at least one bonus item from a plurality of bonus items, the at least one bonus item associated with one or more bonus awards, the one or more bonus awards including a bonanza award;

randomly selecting, via one or more processors, the winning outcome of the plurality of outcomes;

after receiving the player selection of the at least one bonus item, displaying, via one or more display devices, the winning outcome;

after displaying the winning outcome, revealing the one or more bonus awards associated with the selected at least one bonus item; and in response to the one or more bonus awards including the bonanza award, awarding the player, via the one or more processors, the one or more bonus awards including a plurality of additional bonus items corresponding to the bonanza award, and revealing and awarding to the player, via the one or more processors, at least one additional bonus award associated with each of the plurality of additional bonus items, wherein at least one of the one or more additional bonus items is not selected by the player.

19. The medium of claim 18, wherein the selected at least one bonus item is retained automatically for subsequent plays of the wagering game until the player selects a different bonus item.

* * * * *